United States Patent [19]

Koett

[11] 4,130,922

[45] Dec. 26, 1978

[54] HEADLESS RIVETING SYSTEM

[75] Inventor: Albert C. Koett, Norwood, Ohio

[73] Assignee: AKH Inc., Twin Lakes, Wis.

[21] Appl. No.: 849,164

[22] Filed: Nov. 7, 1977

[51] Int. Cl.² .......................................... B23P 11/00

[52] U.S. Cl. ............................ 29/243.53; 29/432.1; 29/509; 29/520

[58] Field of Search ................. 29/243.5, 243.53, 432, 29/432.1, 432.2, 509, 520

[56] References Cited

U.S. PATENT DOCUMENTS

| 3,571,903 | 3/1971 | Persson | 29/432.1 |
| 3,909,913 | 10/1975 | Tildesley | 29/509 |

*Primary Examiner*—James L. Jones, Jr.

*Attorney, Agent, or Firm*—Rummler and Snow

[57] ABSTRACT

A self-piercing riveting system comprising a headless rivet made from steel or a suitable material that provides compressive strength superior to that of the materials to be riveted together and of a height or thickness equal to the sum of the materials to be riveted, the said rivet having flat end surfaces and its body being peripherally concaved between its ends, a die having an opening therethrough of the size and shape of the piercing end of the rivet, and a punch for driving the rivet through the materials to be fastened, the said die and punch each being provided with staking lugs for engaging the margins of the pierced opening through the said materials so as to cause the materials to flow radially against the concaved body of the rivet.

5 Claims, 14 Drawing Figures

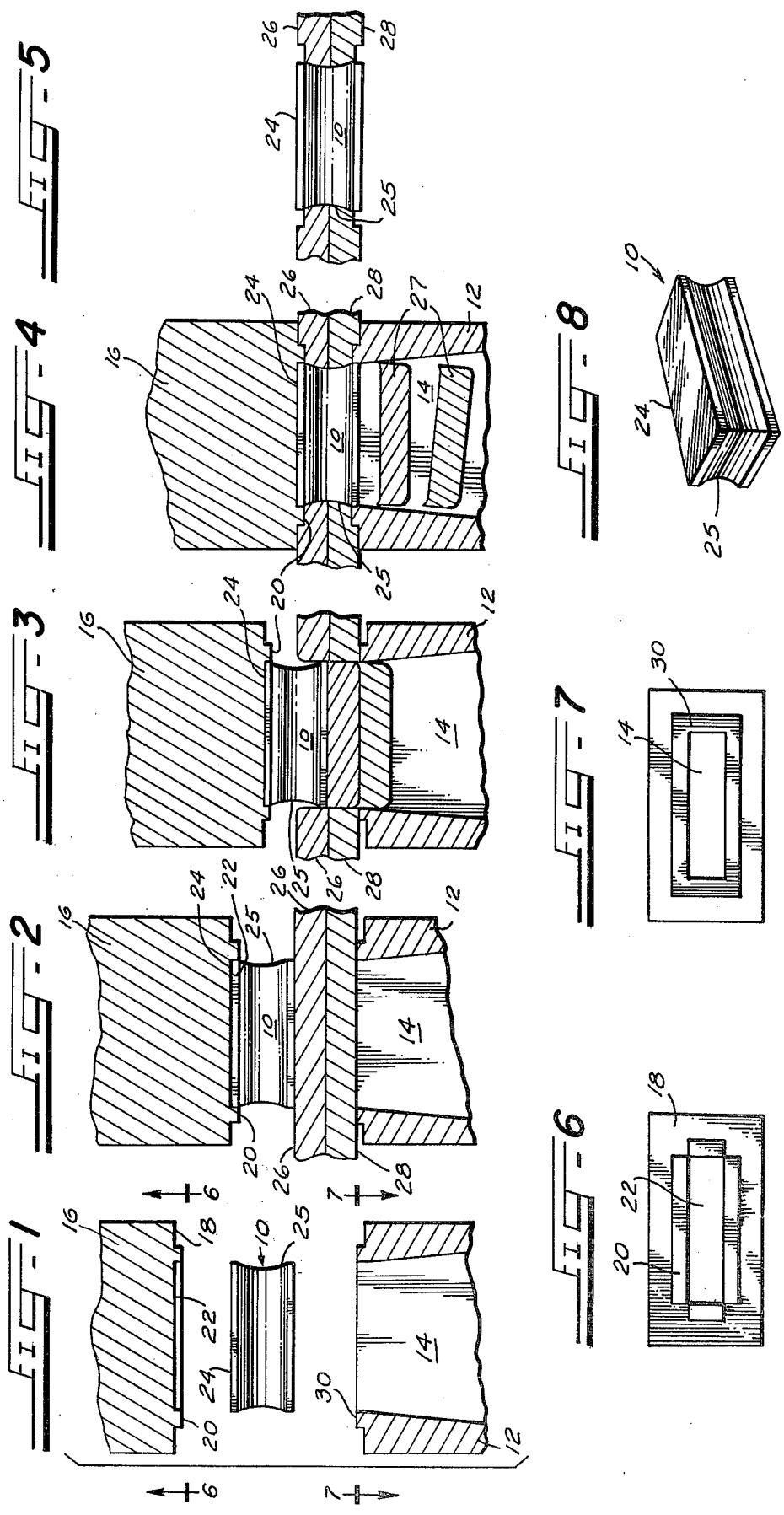

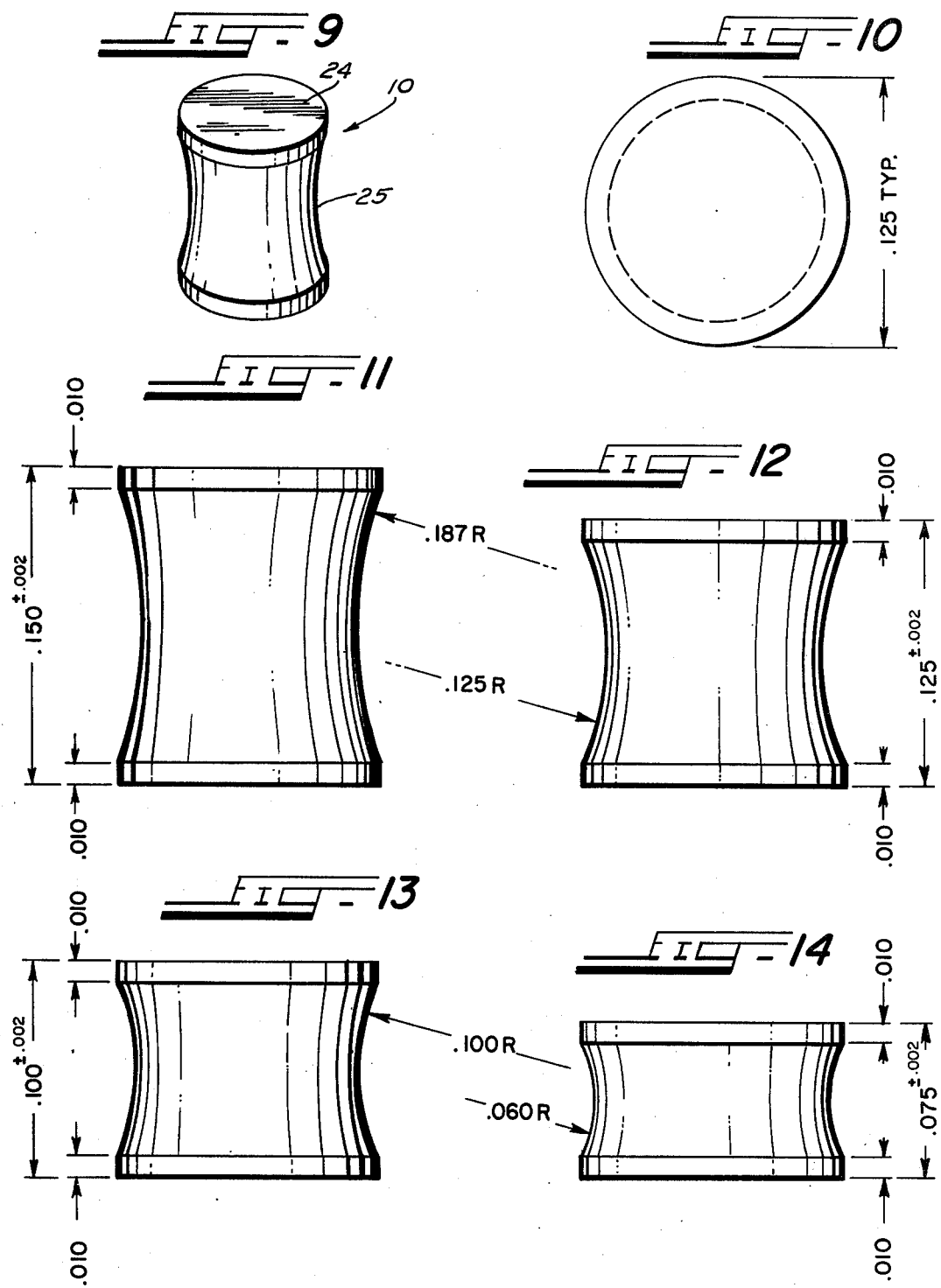

HEADLESS RIVETING SYSTEM

BACKGROUND OF THE INVENTION

This invention is an improvement over the Autolocking Self-Piercing Rivet disclosed in my co-pending application Ser. No. 906,479 filed May 17, 1978 in that it provides for a riveted fastening of sheet materials wherein the ends of the rivet are flush with the surfaces of the fastened materials. Headless riveting itself is not new, as indicated by U.S. Pat. Nos. 3,130,489 and 3,729,804. However, in each of these cases, the lower of the pieces being fastened together must be pre-punched to provide an opening for the fastening element and in no case is the fastening means flush with the surfaces of the finished work.

SUMMARY OF THE INVENTION

The gist of this invention is to provide a combination of punch, die and rivet elements each particularly tailored to the form and size of the other for cooperation to fasten together a plurality of sheet metal pieces by a riveting operation wherein a headless rivet pierces its own opening through the materials being fastened and is then locked in place by a radially inward flow of the sides of the pierced opening.

For this purpose the rivet is made of a material of relatively high compressive strength, such as steel, compared to that of the sheet metal pieces to be fastened and is of a length substantially equal to the combined thickness of the pieces to be fastened together. The rivet is made with flat ends and the body between the ends is somewhat reduced in section.

The die element of this riveting system is made with an opening the shape and size of the piercing end of the rivet and a raised edge or ridge is provided around the die opening to provide a shearing or cutting edge for the rivet to punch out its opening through the pieces to be fastened together. The opening through the die is also formed with diverging sides for free passage of the material punchings.

The punch which engages the rivet to drive it through the pieces being fastened together is made with staking lugs which project from the driving end of the punch around the edges of the area aligned with the die opening and which receives and engages the top end of the rivet to drive it into the work.

DESCRIPTION OF THE DRAWINGS

A specific embodiment of this invention is shown in the accompanying drawings, in which:

FIG. 1 is an exploded view showing the elements comprising the headless riveting system of my invention;

FIG. 2 is a view showing the elements as positioned at the start of a riveting operation;

FIG. 3 is a view showing the relation of the elements with the rivet driven about halfway through the work material;

FIG. 4 is a view showing the relation of the elements at the completion of the riveting operation;

FIG. 5 is a sectional view illustrating the finished riveted work and showing the manner in which the rivet is locked in place;

FIG. 6 is a plan view as on line 6—6 of FIG. 1 showing an arrangement of staking lugs at the rivet engaging end of the punch;

FIG. 7 is a plan view as on line 7—7 of FIG. 1 showing the raised cutting edge surrounding the die opening;

FIG. 8 is a perspective view showing a rivet of rectangular shape;

FIG. 9 is a perspective view showing a rivet of round or cylindrical shape;

FIG. 10 shows the end view of a round rivet; and

FIGS. 11, 12, 13 and 14 are views illustrating the configuration of several sizes of rivets for use with various thicknesses of sheet material pieces to be fastened together.

DESCRIPTION OF THE INVENTION

In the form shown in the drawings, the elements comprising my headless riveting system consist of a headless rivet 10 of rectangular shape such as shown in FIG. 9, a die 12 having a passage 14 therethrough, the sidewalls of which are slightly diverging in the downward direction, and a punch 16 having its rivet engaging end 18 formed with staking lugs 20 which outline the area 22 against which the upper end 24 of the rivet 10 seats when the rivet is being driven through the work represented by the sheet metal pieces 26 and 28.

As shown in FIGS. 1 and 7, the die 12 is formed with a raised cutting ridge 30 which surrounds the opening 14 and serves the dual function of providing a shearing edge for the slugs to be punched out of the metal pieces to be fastened together when the rivet 10 is driven by the punch 16, and of providing staking means for engaging the margins of the punched opening through the lower member 28 of the work material.

The passage or opening 14 through the die member 12 is of the same cross-sectioned shape and size as is the piercing end of the rivet 12, the said opening or passage being larger only to provide shearing clearance for the lugs 27 struck from the work material as they fall through the die opening. (See FIG. 4.) The height of the cutting ridge 30 is preferably about 0.01 to 0.02 inch and, of course, the inner peripheral edge is square to provide for a shearing function.

The punch 16 is preferably made of steel and is designed to drive the rivet 10 through the materials 26, 28 to be fastened together. This punch member 16 has a flat area 22 for engaging the upper end of the rivet and a plurality of raised staking lugs 20 are provided to surround the said rivet engaging area at the edges thereof.

As shown in FIG. 2, the flat upper end 24 of the rivet 10 fits snugly between the staking lugs 20 and in operation the punch, rivet and die are axially aligned. The height of the staking lugs 20 is preferably about the same as that of the die ridge 30.

The rivet 10 may be made of any suitable material, such as steel, having a compressive strength greater than that of the materials required to be pierced. This rivet 10 may also be of any desired cross-section, but its height or axial length must be substantially equal to the sum of the thicknesses of the sheet metal pieces to be fastened together. Preferably the body or shank of the rivet is slightly reduced between its ends, as along a shallow curve which forms a concavity 25 extending between the ends of the rivet, and the ends of the rivet are flat to conform with the top and bottom surfaces of the work, i.e. the pieces 26 and 28.

If the rivet is to be of rectangular cross-section, the end surfaces should be longer than they are wide in order to maintain the anti-rotation feature that such a shape provides, and the width must be of sufficient compressive strength for piercing the materials to be fastened together with a cylindrical rivet, which is the most simple, such as that illustrated by FIGS. 8 and 10 to 14. The end-to-end concavity of the body is preferably formed by a radius having a length substantially equal to the length or height of the rivet, or at least sufficient to afford a positive lock between the rivet and the pierced material, as will be described. With a rivet of rectangular shape, the curvature of the body or shank is preferably the same as that applied to the cylindrical form of rivet, as shown in FIGS. 11 to 14.

The material for the rivets may be cold rolled steel case hardened 0.008–0.010, or LC CRS with carbonitride heat treat 0.008–0.010.

In the operation of my improved headless riveting system, the material to be riveted is placed between the axially aligned punch and die elements of the riveting mechanism, which may be of conventional design, and the rivet 10 is positioned between the punch 16 and the work so as to seat between the staking ribs or ridges 20 at the driving end of the punch, as shown in FIG. 2. The punch 16 then drives the rivet 10 through the work shearing out the slugs 27 and simultaneously coining the margins of the work to cause the work material to flow radially inward to tightly embrace the concaved or reduced shank or body of the rivet and permanently lock the rivet into the work, with the ends of the rivet flush with the top and bottom surfaces of the work, as shown by FIGS. 4 and 5.

The particular advantages of my headless riveting system reside in the double-flush mounting of the rivet in the work; the self-piercing action of the rivet which requires no alignment with preformed openings or other pre-working of the materials to be riveted together; the light weight and portable application of the elements comprising the improved riveting system; and the adaptability of the system for fastening sheet material of any kind.

Although but one embodiment of my invention has been herein shown and described, it will be understood that details of the construction shown may be altered or omitted without departing from the spirit of the invention as defined by the following claims.

I claim:

1. A headless riveting system of the class described comprising:
   (a) a rivet of a length substantially equal to the sum of the thicknesses of the materials to be fastened together and having flat ends of substantially the same size and shape,
   (b) a flat die having opening therethrough of the same size and shape as the rivet end and a ridge surrounding said opening at the edge thereof, and
   (c) a punch having a flat end-area of substantially the same size and shape as the end of the rivet and ridge-like staking means projecting from the edge of said flat end-area at opposite sides thereof,
   (d) the flat end-area of the punch being axially aligned with the opening of said die and spaced from said die a distance sufficient to receive between the punch and die the materials to be riveted together and the rivet positioned in axial alignment with the said die opening.

2. A headless riveting system according to claim 1 wherein the rivet body is of reduced cross-section intermediate the flat ends of the rivet.

3. A headless riveting system according to claim 2 wherein the cross-sectional area of the rivet is the least midway between the ends thereof and becomes progressively enlarged toward each end to reach a maximum adjacent each end.

4. A riveting system according to claim 1 wherein the ends of the rivet are of rectangular shape.

5. A riveting system according to claim 1 wherein the rivet is of generally cylindrical shape with round flat ends.

* * * * *